United States Patent
Can et al.

(10) Patent No.: US 12,338,124 B2
(45) Date of Patent: Jun. 24, 2025

(54) POLYCRYSTALLINE CUBIC BORON NITRIDE BODY

(71) Applicant: Element Six (UK) Limited, Oxfordshire (GB)

(72) Inventors: Antionette Can, Oxfordshire (GB); Holly Samantha Taylor, Oxfordshire (GB); Douglas Geekie, Oxfordshire (GB)

(73) Assignee: Element Six (UK) Limited, Oxfordshire (GB)

( * ) Notice: Subject to any disclaimer, the term of this patent is extended or adjusted under 35 U.S.C. 154(b) by 1497 days.

(21) Appl. No.: 16/649,570

(22) PCT Filed: Oct. 16, 2018

(86) PCT No.: PCT/EP2018/078259
§ 371 (c)(1),
(2) Date: Mar. 20, 2020

(87) PCT Pub. No.: WO2019/076903
PCT Pub. Date: Apr. 25, 2019

(65) Prior Publication Data
US 2020/0277187 A1   Sep. 3, 2020

(30) Foreign Application Priority Data

Oct. 20, 2017   (GB) ...................... 1717270

(51) Int. Cl.
*C01B 21/064*   (2006.01)

(52) U.S. Cl.
CPC ........ *C01B 21/064* (2013.01); *C01P 2002/72* (2013.01); *C01P 2002/76* (2013.01); *C01P 2002/82* (2013.01); *C01P 2004/03* (2013.01); *C01P 2004/20* (2013.01); *C01P 2004/61* (2013.01); *C01P 2006/60* (2013.01)

(58) Field of Classification Search
None
See application file for complete search history.

(56) References Cited

U.S. PATENT DOCUMENTS

| | | |
|---|---|---|
| 3,745,623 A | 7/1973 | Wentorf, Jr. et al. |
| 4,334,928 A | 6/1982 | Hara et al. |
| 4,469,802 A | 9/1984 | Endo et al. |
| 4,562,163 A | 12/1985 | Endo et al. |

(Continued)

FOREIGN PATENT DOCUMENTS

| | | |
|---|---|---|
| CN | 104774591 A | 7/2015 |
| JP | 1993170550 A | 7/1993 |

(Continued)

OTHER PUBLICATIONS

Akaishi, "Synthesis of translucent sintered cubic boron nitride," Journal of Materials Science Letters, vol. 23, No. 24, pp. 1883-1885 (Jan. 1, 1993).

(Continued)

*Primary Examiner* — Guinever S Gregorio
(74) *Attorney, Agent, or Firm* — Armstrong Teasdale LLP (57) ABSTRACT

A translucent polycrystalline cubic boron nitride body is provided. It comprises no more than 2 weight % hexagonal boron nitride grains and has an absorption coefficient of less than 100 $cm^{-1}$ at a wavelength of 1064 nm.

7 Claims, 7 Drawing Sheets

(56) References Cited

U.S. PATENT DOCUMENTS

| | | | |
|---|---|---|---|
| 5,328,875 A | 7/1994 | Ueda et al. | |
| 2015/0158727 A1* | 6/2015 | Tian | B82Y 30/00 264/109 |

FOREIGN PATENT DOCUMENTS

| | | | |
|---|---|---|---|
| JP | 2003192443 A | 7/2003 |
| JP | 2004196567 A | 7/2004 |
| JP | 2004200278 A | 7/2004 |
| JP | 2004250278 A | 9/2004 |
| WO | 2015194728 A | 12/2015 |

OTHER PUBLICATIONS

Taniguchi, "Sintering of cubic boron nitiride without additives at 7.7 GPa and above 2000 degree C," Journal of Materials Research, vol. 14, No. 1, pp. 162-169 (1999).
Sei, "Effect of small amounts of hydrochloric acid on the synthesis of translucent sintered cubic BN," Diamond and Related Materials, vol. 2, No. 8, pp. 1160-1163 (1993).
Search Report for GB1816823.7 dated Apr. 15, 2019 (7 pages).
International Search Report and Written Opinion for PCT/EP2018/078259 dated Dec. 20, 2018 (12 pages).
Search Report for GB1717270.1 dated Apr. 11, 2018 (7 pages).

* cited by examiner

POLYCRYSTALLINE CUBIC BORON NITRIDE BODY

CROSS-REFERENCE TO RELATED APPLICATIONS

This application is the § 371 national stage of International Application No. PCT/EP2018/078259, filed Oct. 16, 2018, which claims priority to Great Britain Application No. 1717270.1, filed Oct. 20, 2017.

FIELD OF INVENTION

The invention relates to the field of polycrystalline cubic boron nitride bodies, and methods of making polycrystalline cubic boron nitride bodies.

BACKGROUND OF INVENTION

Polycrystalline super hard materials, such as polycrystalline diamond (PCD) and polycrystalline cubic boron nitride (PcBN) may be used in a wide variety of tools for cutting, machining, drilling or degrading hard or abrasive materials such as rock, metal, ceramics, composites and wood-containing materials.

Abrasive compacts are used extensively in cutting, milling, grinding, drilling and other abrasive operations. They generally contain ultrahard abrasive particles dispersed in a second phase matrix. The matrix may be metallic or ceramic or a cermet. The ultrahard abrasive particles may be diamond, cubic boron nitride (cBN), silicon carbide or silicon nitride and the like. These particles may be bonded to each other during a high pressure and high temperature compact manufacturing process, forming a polycrystalline mass, or may be bonded via the matrix of second phase material(s) to form a sintered polycrystalline body. Such bodies are generally known as polycrystalline diamond or polycrystalline cubic boron nitride, where they contain diamond or cBN as the ultrahard abrasive, respectively. Examples of diamond and cubic boron nitride abrasive compacts are described in U.S. Pat. Nos. 3,745,623 and 5,328,875.

U.S. Pat. No. 4,334,928 describes a sintered compact for use in a tool consisting essentially of 20 to 80 volume % of cubic boron nitride; and the balance being a matrix of at least one binder compound material selected from the group consisting of a carbide, a nitride, a carbonitride, a boride and a silicide of a IVa or a Va transition metal of the periodic table, mixtures thereof and their solid solution compounds. The matrix forms a continuous bonding structure in a sintered body with the high pressure boron nitride interspersed within a continuous matrix. The methods outlined in this document all involve combining the desired materials using mechanical milling/mixing techniques such as ball milling, mortars and the like.

Polycrystalline super hard materials, such as polycrystalline diamond (PCD) and PcBN may be used in a wide variety of tools for cutting, machining, drilling or degrading hard or abrasive materials such as rock, metal, ceramics, composites and wood-containing materials. A sintered polycrystalline body may be used as a tool insert to form an abrasive or cutting edge.

PCD is not chemically stable with respect to ferrous materials. This means that PCD cannot be used for machining ferrous materials such as steel. In this case, PcBN is typically used instead of PCD. However, PcBN is not as hard or abrasion resistant as PCD, mainly because it consists of a matrix phase in addition to the cBN. It is therefore desirable to reduce or eliminate the matrix phase altogether.

PcBN prepared without a binder have been reported. For example, CN104774591A describes a binderless PcBN abrasive prepared by high pressure high temperature (HPHT) treatment of hexagonal boron nitride (hBN) to effect conversion of the hBN to a PcBN body containing no binder phase. JP2004200278 describes a binderless PcBN prepared using a pressure of 9.5 GPa and a temperature of 1700-1900° C. The very high pressure means that it would be difficult to scale this product up to a commercial process, and only very small samples could be made. It has proven to be very difficult to manufacture sufficiently large pieces of such PcBN bodies to form useful tool inserts.

SUMMARY OF INVENTION

It is an object to provide a PcBN body consisting substantially of cBN with no binder phase.

According to a first aspect, there is provided a translucent polycrystalline cubic boron nitride body comprising:
polycrystalline cubic boron nitride grains;
no more than 2 weight % hexagonal boron nitride grains;
an absorption coefficient of less than 100 $cm^{-1}$ at a wavelength of 1064 nm.

Optionally, the polycrystalline cubic boron nitride body has an absorption coefficient of between 5 and 100 $cm^{-1}$ at a wavelength of 1064 nm, optionally between 10 and 100 $cm^{-1}$ at a wavelength of 1064 nm, and optionally between 20 and 100 $cm^{-1}$ at a wavelength of 1064 nm.

As an option, at least 50% of the cubic boron nitride grains are twinned.

The polycrystalline cubic boron nitride body optionally is disc-shaped and has a diameter selected from between 10 mm and 25 mm, and a height selected from 4 mm to 25 mm. These dimensions open up a range of practical applications for the body, particularly in the field of machining.

As an option, the polycrystalline cubic boron nitride body has a diameter selected from between 12 mm and 16 mm, and a height selected from 8 mm to 12 mm.

The polycrystalline cubic boron nitride body optionally consists of polycrystalline cubic boron nitride grains and no more than 2 weight % hexagonal boron nitride grains.

The polycrystalline cubic boron nitride body optionally includes any of no more than 1.5 weight % hexagonal boron nitride grains; no more than 1.0 weight % hexagonal boron nitride grains; no more than 0.5 weight % hexagonal boron nitride grains; no more than 0.2 weight % hexagonal boron nitride grains; and no more than 0.1 weight % hexagonal boron nitride grains.

As an option, the polycrystalline cubic boron nitride body has any of a Knoop hardness of greater than 3800 HK1 under a 1 kg load; a Knoop hardness of greater than 4000 HK1 under a 1 kg load; a Vickers Hardness of greater than 35 GPa; a Vickers hardness of greater than 40 GPa; a Vickers hardness of greater than 45 GPa; and a Vickers hardness of greater than 50 GPa.

As an option, the polycrystalline cubic boron nitride body has any of an absorption coefficient of less than 100 $cm^{-1}$ at a wavelength of 700 nm; and an absorption coefficient of less than 150 $cm^{-1}$ at a wavelength of 500 nm.

As an option, the polycrystalline cubic boron nitride body has any of an absorption coefficient of less than 50 $cm^{-1}$ at a wavelength of 1064 nm; and an absorption coefficient of less than 30 $cm^{-1}$ at a wavelength of 1064 nm.

According to a second aspect, there is provided a translucent polycrystalline cubic boron nitride body comprising:

polycrystalline cubic boron nitride grains;
no more than 2 weight % hexagonal boron nitride grains;
an absorption coefficient of less than 100 cm$^{-1}$ at a wavelength of 350 nm.

Optionally, the polycrystalline cubic boron nitride body has an absorption coefficient of between 5 and 100 cm$^{-1}$ at a wavelength of 350 nm, optionally between 10 and 100 cm$^{-1}$ at a wavelength of 350 nm, and optionally between 20 and 100 cm$^{-1}$ at a wavelength of 350 nm.

As an option, at least 50% of the cubic boron nitride grains are twinned.

The polycrystalline cubic boron nitride body optionally is disc-shaped and has a diameter selected from between 10 mm and 25 mm, and a height selected from 4 mm to 25 mm.

As an option, the polycrystalline cubic boron nitride body has a diameter selected from between 12 mm and 16 mm, and a height selected from 8 mm to 12 mm.

As an option, the polycrystalline cubic boron nitride body consists of polycrystalline cubic boron nitride grains and no more than 2 weight % hexagonal boron nitride grains.

The polycrystalline cubic boron nitride body optionally includes any of no more than 1.5 weight % hexagonal boron nitride grains; no more than 1.0 weight % hexagonal boron nitride grains; no more than 0.5 weight % hexagonal boron nitride grains; no more than 0.2 weight % hexagonal boron nitride grains; and no more than 0.1 weight % hexagonal boron nitride grains.

As an option, the polycrystalline cubic boron nitride body has any of a Knoop hardness of greater than 3800 HK1 under a 1 kg load; a Knoop hardness of greater than 4000 HK1 under a 1 kg load; a Vickers Hardness of greater than 35 GPa; a Vickers hardness of greater than 40 GPa; a Vickers hardness of greater than 45 GPa; and a Vickers hardness of greater than 50 GPa.

The polycrystalline cubic boron nitride body optionally has any of an absorption coefficient of less than 100 cm$^{-1}$ at a wavelength of 700 nm; and an absorption coefficient of less than 150 cm$^{-1}$ at a wavelength of 500 nm.

According to a third aspect, there is provided a method of manufacturing a polycrystalline cubic boron nitride body. The method comprises:
providing a green body comprising hexagonal boron nitride particles, the green body having a density of at least 95% of the theoretical density of hexagonal boron nitride;
subjecting the green body to a sintering process at a pressure of at least 7.7 GPa and a temperature of at least 2100° C., to convert the hexagonal boron nitride to form the polycrystalline cubic boron nitride material.

As an option, the hexagonal boron nitride particles have an oxygen content selected from no less than 0.1 weight % and no more than 0.4 weight %.

As a further option, the hexagonal boron nitride particles have an oxygen content selected from no more than 0.3 weight %; and no more than 0.2 weight %.

The temperature is optionally selected from any of between 2100° C. and 2300° C., and between 2200° C. and 2300° C.

Optionally, the pressure is selected from any of 7.7 to 8.5 GPa, and 8.0 to 8.5 GPa.

As an option, the sintering process is held at a maximum pressure and temperature for any of at least 3 minutes, at least 5 minutes, and at least 10 minutes.

The method optionally comprises cold isostatic pressing the hexagonal boron nitride particles to densify the green body prior to sintering. As a further option, the cold isostatic pressing is performed at a pressure of between 0.2 GPa and 4 GPa. As a further option, the cold isostatic pressing is performed at a pressure of any of greater than 0.4 GPa and 0.6 GPa.

As an option, the green body consists of hexagonal boron nitride particles apart from unavoidable impurities.

As an option, the method further comprises, prior to providing the green body comprising hexagonal boron nitride particles, nitriding the hexagonal boron nitride particles in ammonia gas at a temperature of between 900 and 1100° C. This method may leave unavoidable impurities in a method where the green body otherwise consists of hexagonal boron nitride particles.

According to a fourth aspect, there is provided a device comprising the polycrystalline cubic boron nitride body described above in either of the first or second aspects.

As a further option, the device comprises any of an insert for a machining tool, a wire drawing die, an optical transmission element and a heat spreading element.

BRIEF DESCRIPTION OF THE DRAWINGS

For a better understanding of the present invention and to show how the same may be carried into effect, embodiments of the present invention will now be described by way of example only with reference to the accompanying drawings, in which.

DETAILED DESCRIPTION

It has been found that direct conversion of hexagonal boron nitride (hBN) to cubic boron nitride (cBN) can be effected at pressures above 7.7 GPa and temperatures above 2100° C. This material has no binder phase and almost all of the hBN converts to cBN. The final PcBN material has an hBN content of no more than 2 weight %. As the hBN content is so low, the resultant PcBN material is translucent, displaying an absorption coefficient of less than 100 cm$^{-1}$ at a wavelength of 1064 nm. Previous binderless PcBN materials prepared by direct conversion of hBN to cBN have been black, which is thought to be caused by significant amounts of unconverted hBN remaining at the grain boundaries between cBN grains.

Figure 1:
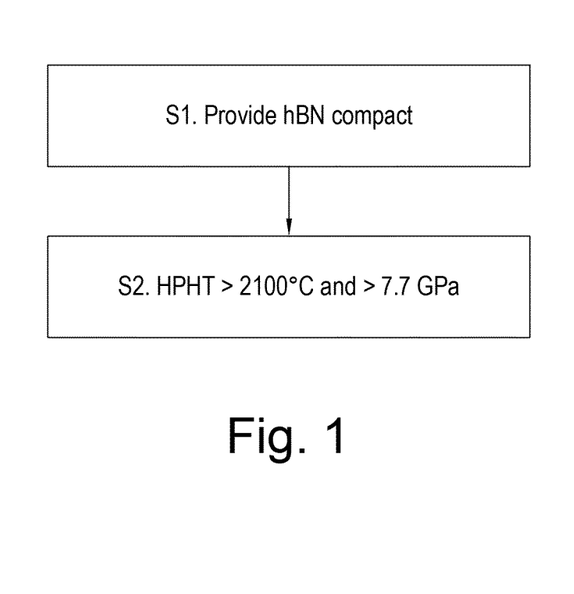
FIG. 1 is a flow diagram listing the steps to effect direct conversion of hBN to cBN.

FIG. 1 is a flow diagram illustrating the process. The following numbering corresponds to that of FIG. 1.

S1. An hBN green body is provided. This may be prepared, for example, by cold isostatic pressing at a pressure of between 0.2 and 4.0 GPa (a minimum pressure of 0.4 or 0.6 GPa may give better results). It is thought that an oxygen content of the hBN powders of more than 0.1 weight % oxygen and no more than 0.4 weight % oxygen is beneficial. This includes free oxygen or oxygen in other forms, such as water or —OH groups. While not wishing to be bound by a specific theory, it is possible that a small amount of oxygen and/or water acts as a catalyst in the conversion of hBN to cBN.

S2. Direct conversion of hBN to cBN is effected in an HPHT process using a pressure of at least 7.7 GPa and a temperature of at least 2100° C. Temperatures of up to 2300° C. and pressures of up to 8.5 GPa have been found to be effective. The sintering process may last for at least 3 minutes.

A high level of twinning of the resultant cBN grains has been observed in some samples. This is thought to occur during nucleation of cBN during the direct conversion process, as it is observed for very short runs where full conversion has not occurred and some unconverted hBN remains.

The method described above allows large PcBN bodies to be made. Discs having a diameter from 10 mm to 18 mm, and a height from 4 mm to 15 mm have been produced.

EXAMPLES

All of the Examples were made using hBN powders. Different hBN powders were tested, as listed in Table 1.

TABLE 1

Physical and chemical specifications of hBN powders used in examples presented here.

| Powder | Oxygen Content wt % | $B_2O_3$ % | CaO % | C % | Particle size μm |
|---|---|---|---|---|---|
| A | 0.162 | 0.03 | 0.01 | 0.02 | 8.000 |
| B | 0.131 | 0.04 | 0.02 | 0.02 | 11.000 |
| C | 0.740 | | | | 2.619 |
| D | 0.585 | | | | 9.000 |
| E | 0.155 | | | | 17.512 |

To prepare Example 1, hBN powder A was compacted to form a green body and then subjected to high pressure and temperature cycles within HPHT apparatus for 3 minutes in order to directly convert hBN to cBN in a polycrystalline solid piece. Pressures were initially varied between 7 and 7.5 GPa and temperatures of 2100° C. and 2300° C. to produce sintered discs of PcBN.

Figure 2:
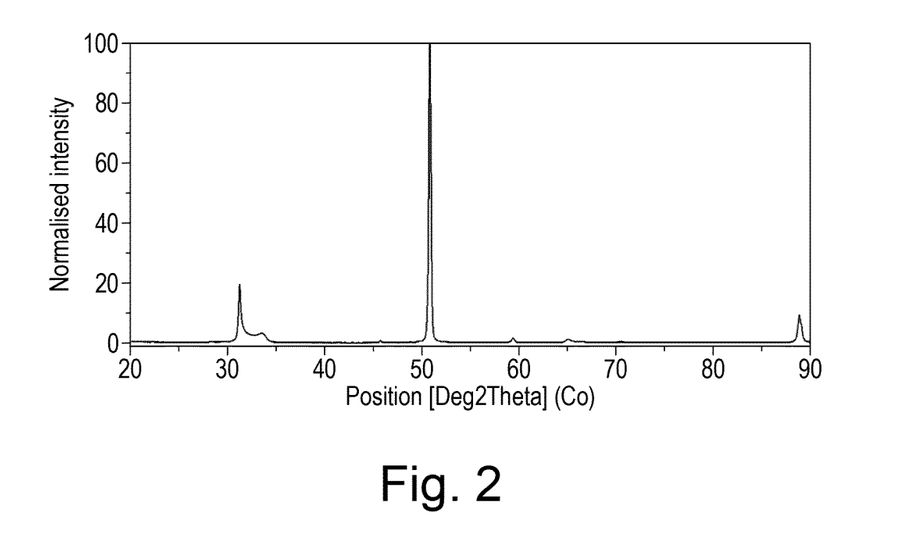
FIG. 2 is an X-ray diffraction trace from Example 2.

Raman spectra collected from the sintered discs were used confirm the presence of cBN and the quality of the crystallinity within the disc from the signal to noise ratio. X-Ray Diffraction (XRD) spectra were also used to confirm the presence of the cubic phase. This XRD data also revealed a small amount of hBN which had not converted, as illustrated in FIG. 2. The XRD spectrum of FIG. 2 shows a cBN 111 peak at 50.75 two theta degrees, and a small amount of residual hBN with a peak at 31.22 two theta degrees.

Figure 3:
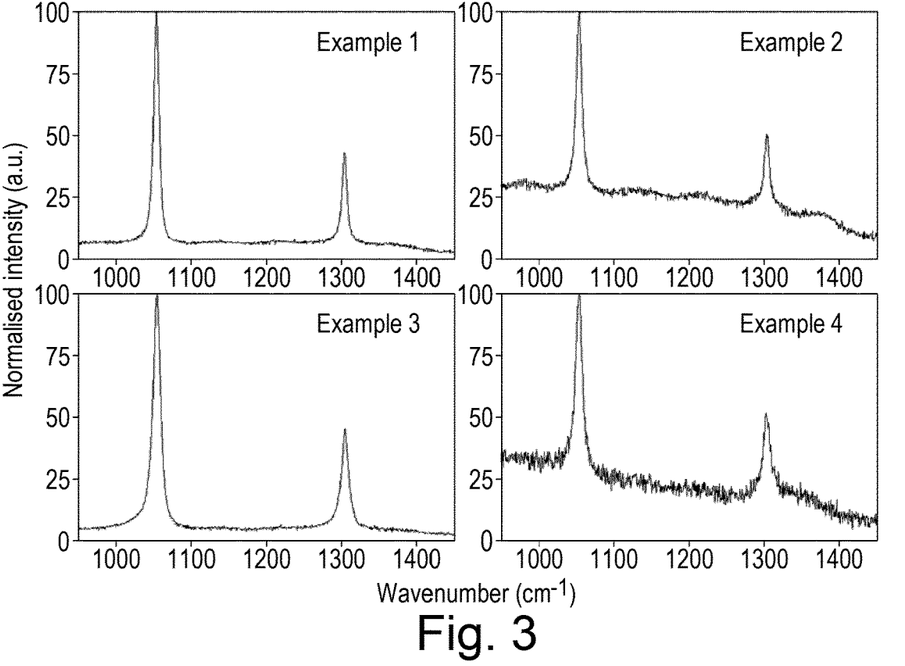
FIG. 3 shows Raman spectra of cBN discs sintered from hBN powders A-D via the synthesis detailed in Examples 1, 2, 3 and 4.

Examples 2 to 4 were repeats of the procedure detailed in Example 1, but made using hBN powders B-D respectively. Typical Raman spectra from the cBN discs produced from these are presented in FIG. 3.

Discs produced from Examples 1 to 4 were opaque and black/dark grey in colour. Examples 2 and 3 showed high thermal conductivity, greater than 200 W m$^{-1}$ K$^{-1}$ (measured using Netzsch® laser flash apparatus LFA 467 HyperFlash® at 25° C.). A high thermal conductivity is a desired property in the application of high speed precision machining high resistance super alloys (HRSA), as it allows heat generated during the machining process to be dissipated or spread more quickly.

From the initial work performed on Examples 1 to 4, powder D was discounted from further work as it gave a poorly defined and noisy Raman spectrum, indicating poor crystallinity.

With Example 5, powder A was subjected to the same process as Examples 1 to 4, however the temperature was fixed at 2200° C. and the pressure at 7.5 GPa. The resultant PcBN discs were translucent.

With Example 6, powder A was subjected to the same process as Example 5, but using a pressure of 8 GPa. The resultant PcBN discs were translucent.

With Example 7, powder B was subjected to the same process as used in Example 5. The resultant discs contained some cBN, but a lot of unconverted hBN remained.

With Example 8, powder B was subjected to the same process as used in Example 6. The resultant PcBN discs were translucent with a blue hue.

With Example 9, powder C was subjected to the same process as used in Example 5. The resultant PcBN discs were translucent with a yellow/orange hue.

With Example 10, powder E was subjected to the same process as used in Example 5. The resultant discs contained some cBN, but a lot of unconverted hBN remained.

With Example 11, powder E was subjected to the same process as used in Example 6. Discs of cBN produced were translucent with a blue/green hue.

Figure 4:
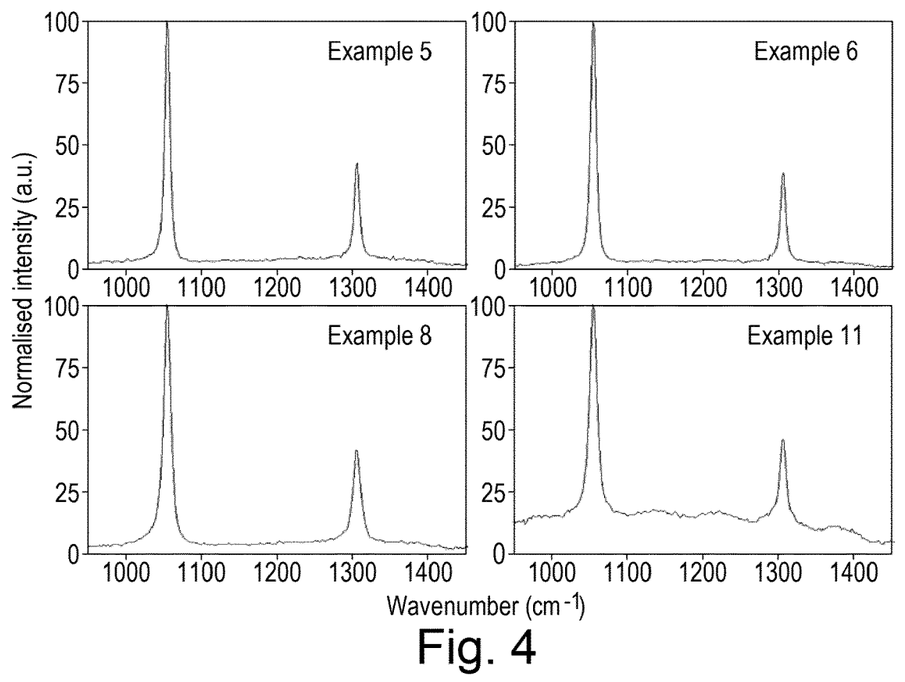
FIG. 4 shows Raman spectra acquired from Examples 5, 6, 8 and 11.

The translucency that was observed in Examples 5, 6, 8, 9 and 11, all falling within the scope of the claims, was due to the high purity of cBN produced and the reduction in scattering centres such as residual hBN and porosity. Raman spectra, presented in FIG. 4, taken from these examples show good quality crystallinity of the converted cBN from the good signal to noise ratio arising from the lack of scattering. XRD spectra taken from the surfaces of these discs also confirmed that the cubic phase dominated and very little hBN remained in these examples.

Figure 5:
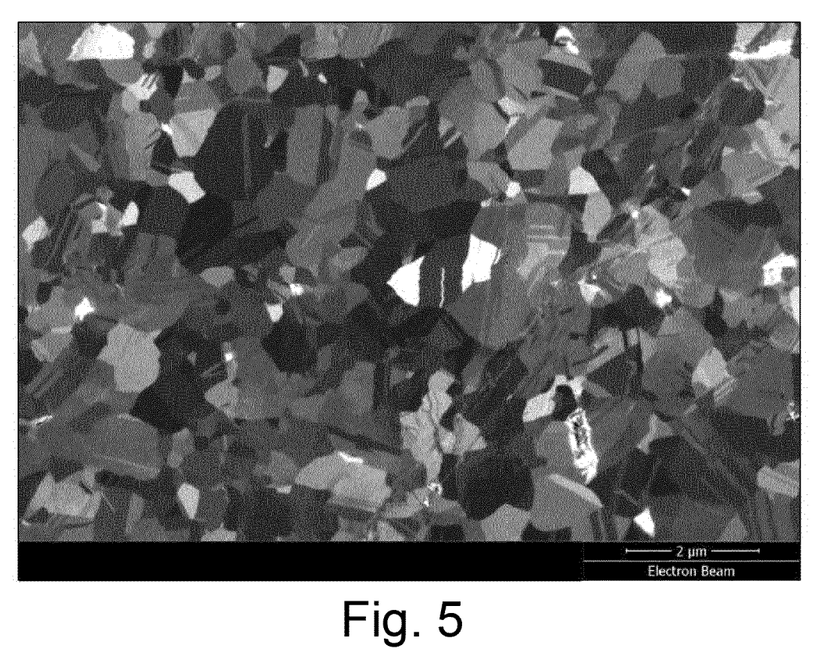
FIG. 5 is a scanning electron micrograph of Example 6.
Figure 6:
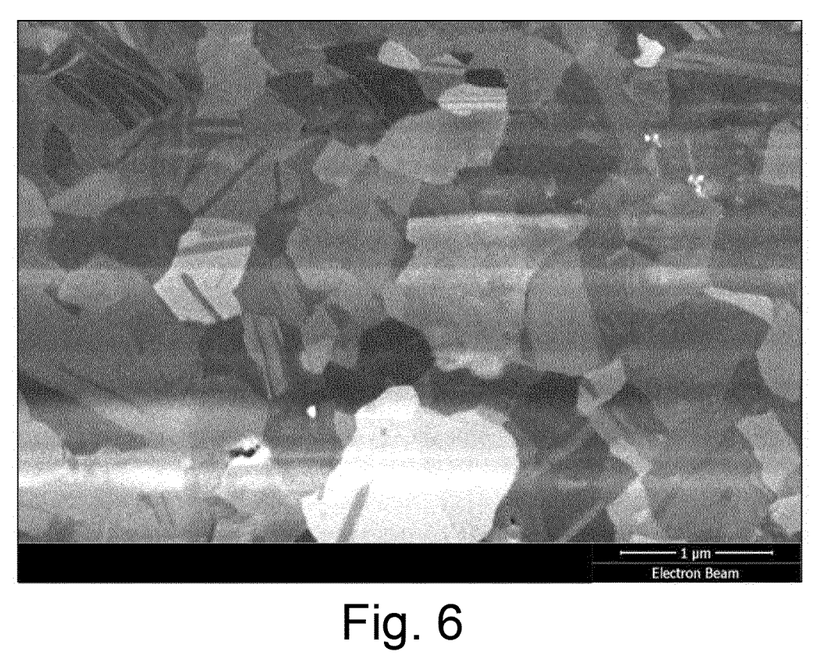
FIG. 6 is a scanning electron micrograph of Example 8.

The microstructure of these examples also showed no discernible porosity and high amounts of twinning in the cBN grains. The Scanning Electron Microscopy (SEM) images of FIG. 5 show a large number of twinned grains for Example 6, and the SEM image of FIG. 6 similarly shows a large number of twinned grains for Example 8. Twinning is advantageous in many machining applications, as it increased the Knoop microhardness. Average grain sizes of 200 to 1000 nm were observed.

Examples 6 and 8 had higher thermal conductivities than previous examples synthesised at lower pressures (Examples 1 and 2). Thermal conductivity was measured to be approximately 200 and 250 Wm$^{-1}$ K$^{-1}$ for Examples 6 and 8 respectively. This implies lower porosity and lower impurities for Examples 6 and 8

Figure 7:
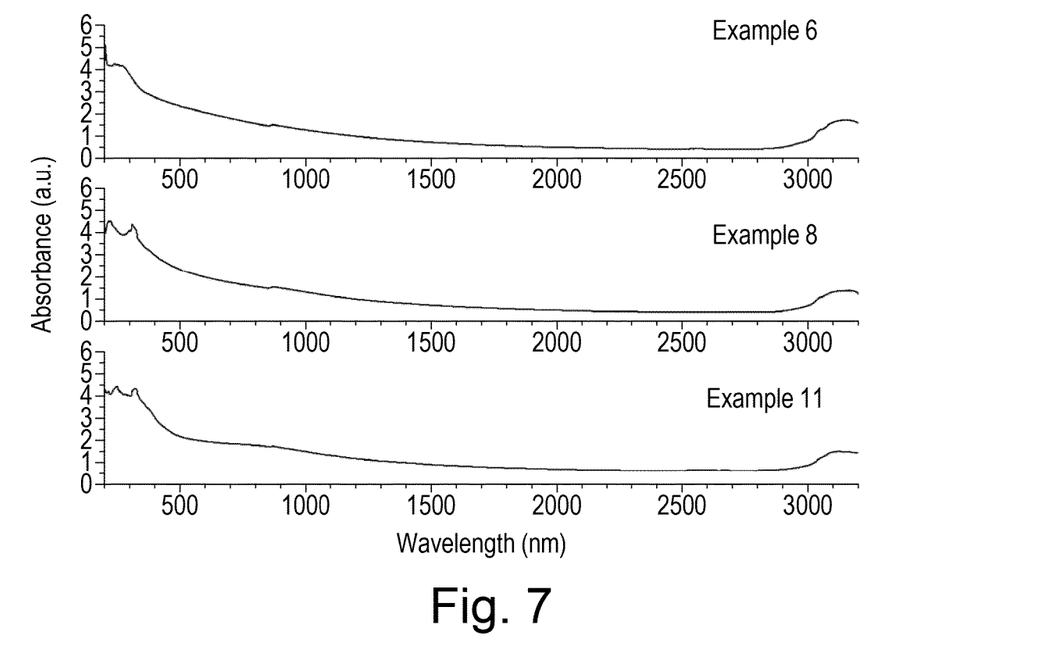
FIG. 7 shows UV-Vis absorption spectra for Examples 6, 8 and 11.

The translucency of the PcBN sintered discs can be quantified by the absorption of UV-Vis light. The absorption spectra between 200 and 3200 nm of Examples 6, 8 and 11 is shown in FIG. 7. From this the molar absorption coefficients at 700 nm, a (700 nm), of Examples 6, 8 and 11 were calculated to be 91.9, 89.7 and 24.4 cm$^{-1}$ respectively.

The average largest dimension in any direction of the pieces produced was 8.3 mm along with an average volume of 0.2 cm$^3$. This volume is impractical and inefficient for the large-scale production of precision work pieces.

In order to obtain a larger piece of material from each HPHT cycle, with a minimum diameter of recovered material of 13 mm, larger volumes of hBN were placed in the HPHT vessel. For the complete direct conversion of the larger amount of hBN powder, longer HPHT cycles were required. It was also found that densification of the hBN powder before being subjected to the HPHT cycle enabled the retention of high pressure throughout the HPHT cycle.

With Example 12, hBN powder B was subjected to a cold isostatic pressing (CIP) cycle at a pressure of around 3 GPa in a ceramic cup to densify the powder before HPHT sintering. The green body had a density of greater than 95% of the theoretical density of hBN, indicating low porosity. Use of higher pressures can reach densities of greater than 98% of the theoretical density of hBN. The block of densified powder was then subjected to the same HPHT cycle as in Example 5 at 7.5 GPa. However, the cycle time (including heating and holding at temperature) was extended from 3 minutes to 10 minutes. The resultant disc was black and opaque, thus falling outside the scope of the claims. Raman spectroscopy and XRD confirmed that conversion from hBN to cBN had occurred and a small amount of hBN remained in the sample.

Figure 8:
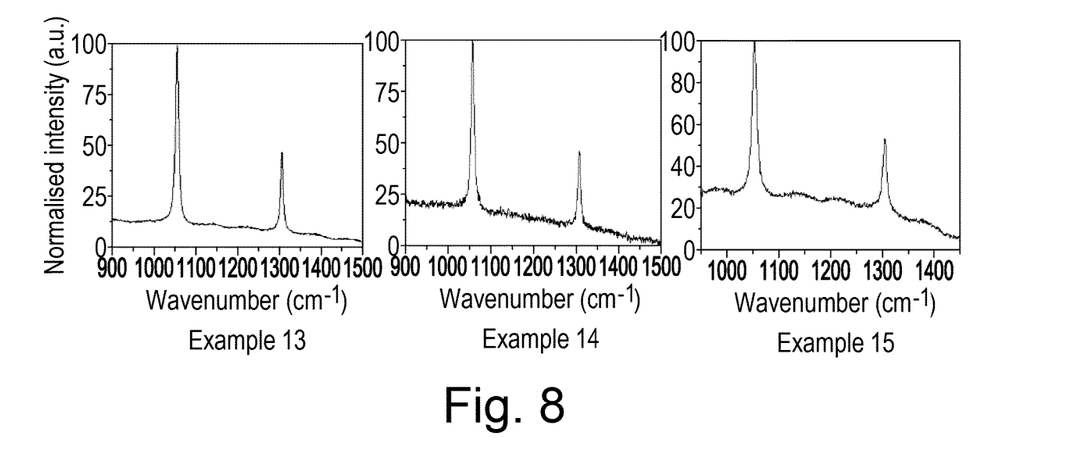
FIG. 8 shows Raman spectra acquired from Examples 13, 14 and 15.

With Examples 13, 14 and 15, hBN precursor powders B, A and E respectively were subjected to the same CIP and HPHT sintering process as Example 12 but using a maximum the pressure of 8 GPa. The resultant PcBN discs were translucent, thus all falling within the scope of the claims. Raman spectra confirmed the presence of only cBN with good quality crystallinity from a high signal to noise ratio. Raman spectra from Examples 13, 14 and 15 are shown in FIG. 8. XRD spectra (not shown) data also confirmed the presence of only cBN.

With Example 16, hBN powder C was subjected to the same process as in example 13. This sample failed to produce single solid pieces of material. While not wishing to be bound by a particular theory, it is thought that this may be caused by a high oxygen content in the hBN powder.

Examples 13, 14 and 15 had a minimum largest dimension in any direction of 13 mm, a minimum volume of 0.7 cm$^3$ and a density on average of 3.469 g cm$^{-3}$. This density is 99.8% of the theoretical density of cBN (3.475 g cm$^{-3}$).

Figure 9:
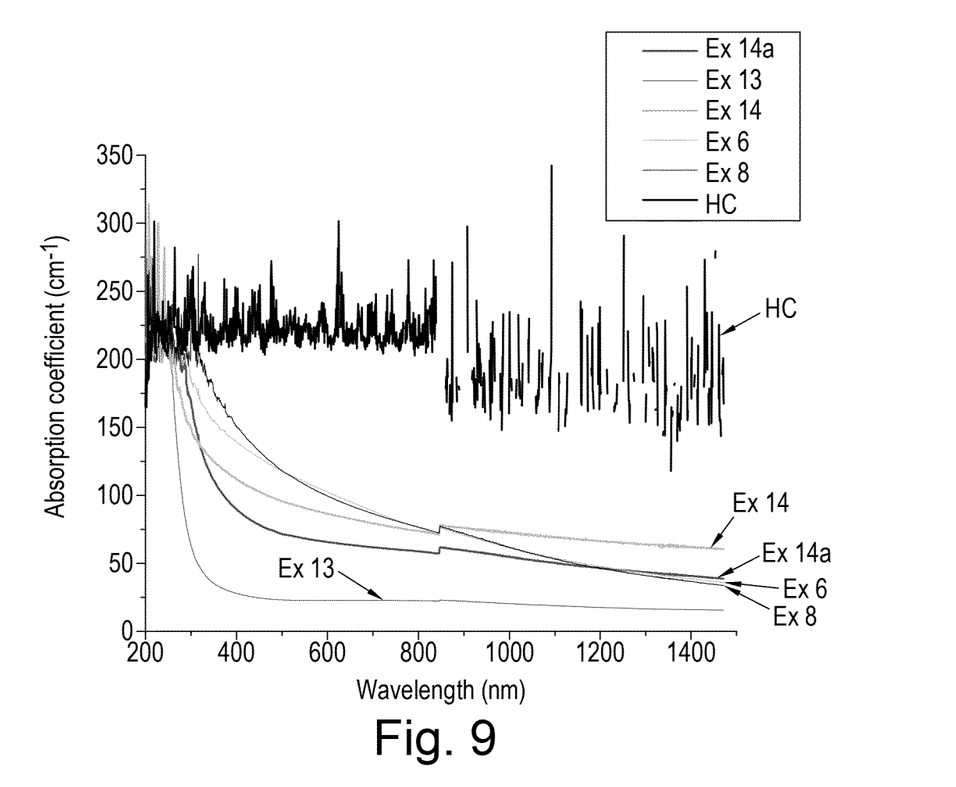
FIG. 9 shows the absorption coefficient measured at different wavelengths for various Example materials.
Figure 10:
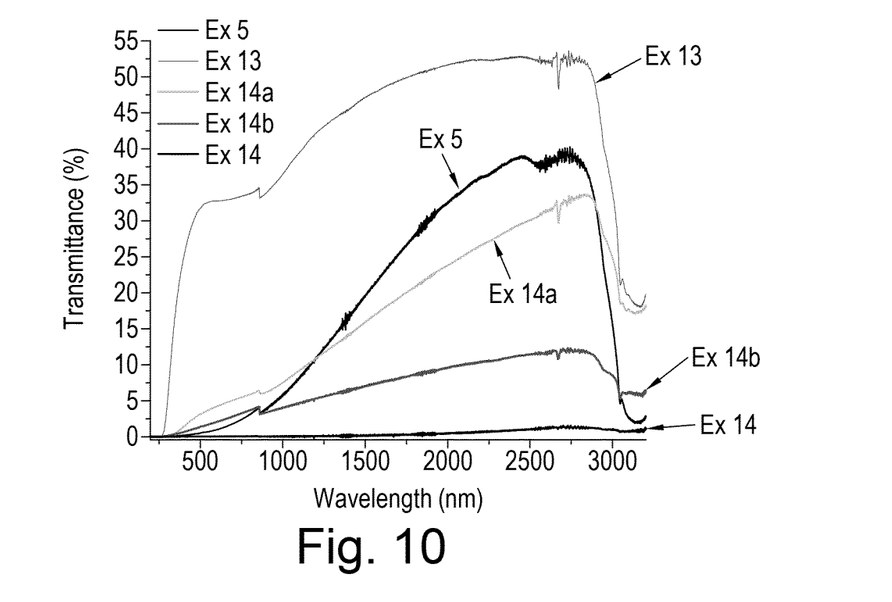
FIG. 10 shows transmittance data measured at different wavelengths for various Example materials.

To provide an indication of the translucency, it has been quantified in terms of absorption coefficient calculated from the absorbance spectra. FIG. 9 shows the absorption coefficient of various samples. Absorbance spectra for samples were taken between 200 nm and 1500 nm using a Perkin Elmer® UV-Vis/NIR Lamba 19 Spectrophotometer with a detector change at 860 nm (PMT for 200<λ<860 nm and PbS for 860<λ<3200 nm) and a lamp change at 319 nm (Deuterium lamp for 200<λ<319 nm and a Halogen lamp for 319<λ<3200 nm), in absorbance mode with a scan speed of 60 nm min$^{-1}$ and NIR sensitivity of 3. A hot compacted sample (HC) was also prepared, which consisted of hot pressed cBN containing residual hBN at the grain boundaries to give it a black colour. It can be seen that the black sample, HC, had a much higher absorption coefficient at most wavelengths than the other samples.

Details of the absorption coefficient at various wavelengths are provided in Table 2.

TABLE 2

Absorption coefficients of various samples at specific wavelengths

| | Example 6 | Example 8 | Example 13 | Example 14a | Example 14 | HC |
|---|---|---|---|---|---|---|
| $\alpha_{200\,nm}$ | 205 | 216 | 219 | 294 | 205 | 202 |
| $\alpha_{300\,nm}$ | 193 | 205 | 67.7 | 175 | 155 | 230 |
| $\alpha_{350\,nm}$ | 159 | 187 | 37 | 115 | 129 | 204 |
| $\alpha_{500\,nm}$ | 122 | 122 | 23.8 | 73.9 | 98.6 | 187 |
| $\alpha_{700\,nm}$ | 91.9 | 89.7 | 23.4 | 63.5 | 82 | 174.6 |
| $\alpha_{1064\,nm}$ | 59.5 | 58.7 | 20.3 | 53.8 | 72.3 | Not measured |

Examples 14a and 14b were prepared in the same way as Example 14, but both using a sintering pressure of 7.5 GPa. Examples 14a and 14b were prepared under the same nominal conditions but in different runs.

Figure 11:
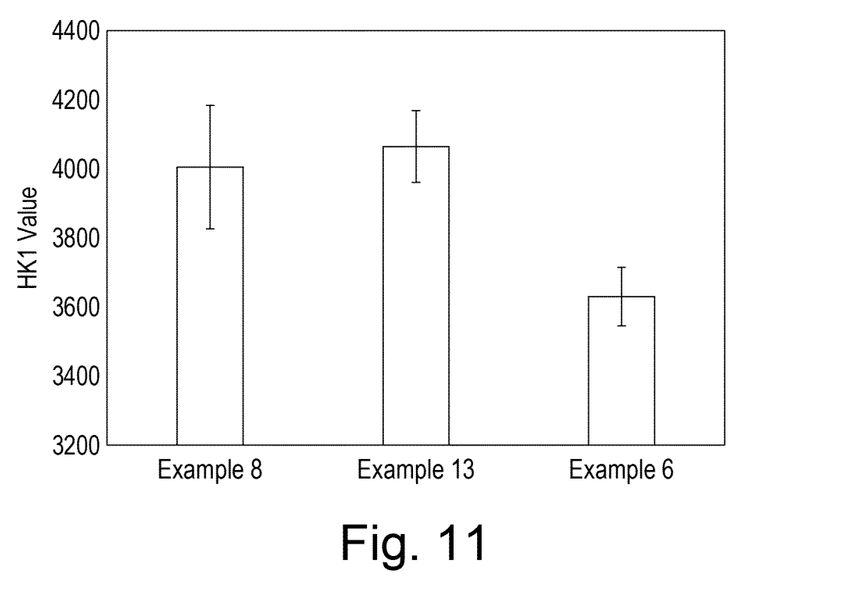
FIG. 11 shows Knoop hardness values for various Example materials.

FIG. 11 shows Knoop hardness values for various Examples. Example 6 had a Knoop hardness of around 3600 HK1 under a 1 kg load (38 GPa) and Example 8 had a Knoop hardness of around 4000 HK1 under a 1 kg load (40 GPa). Example 13 had a Knoop hardness greater than 4000 HK1 under a 1 kg load (40 GPa).

Vickers hardness was also measured for certain Examples, with the results shown in Table 3.

TABLE 3

Vickers Hardness of selected Samples

| Example | Average/GPa | SD |
|---|---|---|
| 8 | 47 | 5.21 |
| 6 | 42 | 5.7 |
| 13 | 52 | 5.21 |

The effects of nitriding the hBN powder before sintering were investigated in order to test the effects on reducing the oxygen content of the hBN powders. Six batches of Example 13 (termed Example 13a to 13f) were made.

Prior to sintering, the hBN powders for Examples 13d, 13e and 13f were heated at a rate of 5° C. to a temperature of 900° C. under nitrogen. The powders were then held at 1000° C. for 4 hours and the nitrogen was replaced by ammonia gas with a flow rate of 2 litres/minute. The powders were then allowed to cool back to room temperature. Nitriding of other samples was carried out with ammonia flow rates of between 3 and 6 litres per minute and temperatures of between 900 and 1100° C. for between 1 and 4 hours.

The nitrided Examples were much less translucent than the un-nitrided samples, being grey-black in colour, and the powders had a lower measured oxygen content (between 0.038 and 0.131 weight %)

Figure 12:
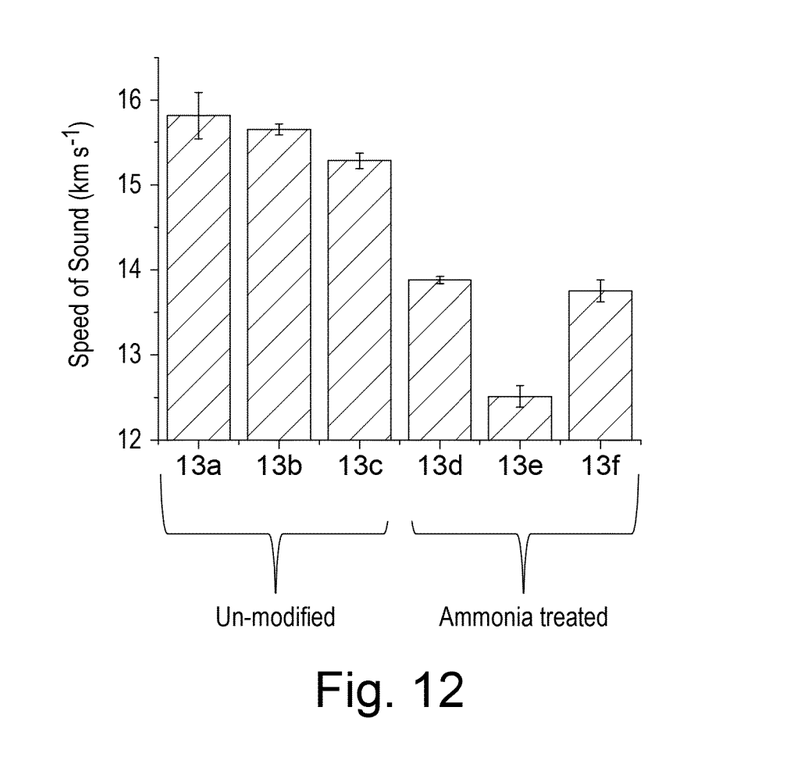
FIG. 12 shows the speed of sound measured for various samples.

The speed of sound was measured through the nitrided samples and control samples (Examples 13a, b, and c), and is shown in FIG. 12. Speed of sound was measured using an 'Olympus® 38DL plus', which works by sending an acoustic excitation pulse through the sample and recording how long it takes the pulse to get back to the detector taking into account the thickness of the sample.

It can be seen that the speed of sound of the nitrided Examples was far lower than that of the Examples that had not been nitrided. This indicates that the samples were not fully sintered and there was a smaller degree of bonding between adjacent grains of cBN than there was for other samples.

While not wishing to be bound by a specific theory, it is thought that the nitrided samples did not convert all of the hBN to cBN (which is supported by the difference in colour of the Examples). It has been suggested (for example in JP2003192443 and WO2015194728) that a reduction in oxygen is beneficial to improve the conversion rate. Nitriding replaces oxygen/water in the hBN powders, but in this case a reduction in oxygen/water to less than 0.1 weight % was not beneficial and full conversion of hBN to cBN did not occur. As mentioned above, water may act as a catalyst for nucleation of cBN. This work suggests that an oxygen level of between 0.1 and 0.4 weight %, and in particular between 0.1 and 0.2 weight % oxygen in the hBN powder is optimal for providing sufficient catalysis for conversion of hBN to cBN.

The binderless PcBN materials produced as described above have many applications. The hardness and toughness makes them suitable for mechanical applications, such as machining, turning, and wire dies. The translucency allows them to be used in optical applications. The thermal conductivity allows them to be used in heat sink/heat spreading applications.

In order to test the mechanical properties, tool inserts were prepared using Examples 6, 8, 13 and 14 by cutting them into triangles and brazing the triangles onto a carbide tool. The inserts had a CNGA12040852020 geometry with a 200 μm chamfer width, a 20° chamfer angle, and a 10 μm hone. In addition, Examples 13a and 14c were prepared under the same conditions as Examples 13 and 14 respectively, and subsequently annealed under vacuum at a ramp rate of 5° C./minute to a hold temperature of 900° C. The samples were then held at 900° C. for two hours before air cooling to room temperature. A control sample, CS, was also provided. CS is a commercial grade of PcBN containing 90% cBN in a binder phase.

Figure 13:
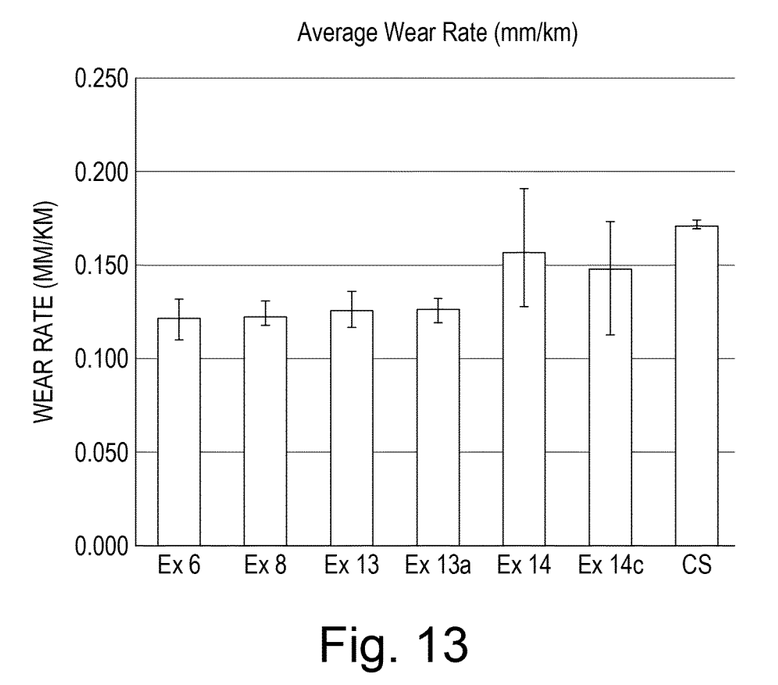
FIG. 13 shows wear test results for tool inserts made using various Example PcBN materials.
Figure 14:
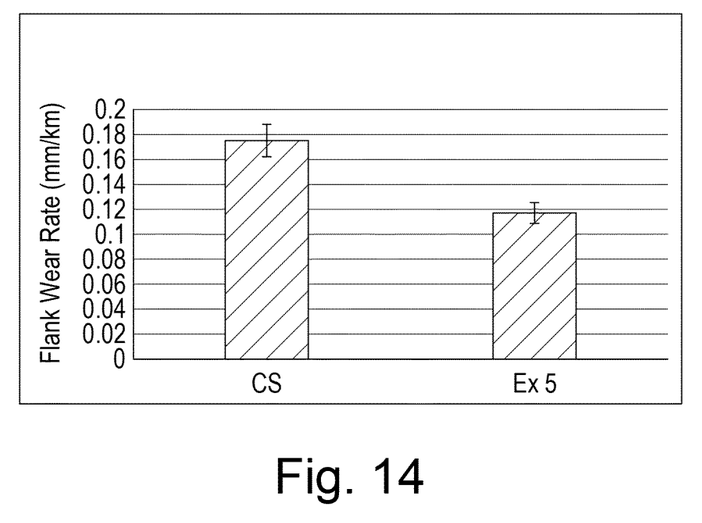
FIG. 14 shows flank wear test results for tool inserts made using Example PcBN materials.

The wear rate of the tools was measured using a Vanadus 10 steel workpiece using a cutting speed of 100 m/minute, a feed rate of 0.1 mm/revolution and a cut depth of 0.2 mm, and the flank wear scar (Vb) was measured. A smaller wear scar means a higher abrasion resistance, and can be expected to lead to longer tool life. If can be seen from FIGS. 13 and 14 that the binderless PcBN materials all had a lower wear rate than the control sample, suggesting that they have improved abrasion resistance.

The translucency is indicative of the amount of residual hBN in the PcBN, and so is thought to have a positive effect on the mechanical properties of the resultant PcBN. While the above discussion refers to the mechanical properties of the binderless PcBN, it will be appreciated that the translucency allows applications previously unavailable to PcBN type materials. For example, the low absorption coefficient may allow applications in lasers or laser guided machining. The term "optical transmission element" as used herein refers to any type of device that allows the transmission of electromagnetic radiation, particularly in the ultra-violet, visible or infra-red spectrum.

Definitions

As used herein, a "super hard material" is a material having a Vickers hardness of at least 28 GPa. Diamond and cubic boron nitride (cBN) material are examples of super hard materials.

As used herein, PcBN (polycrystalline cubic boron nitride) material refers to a type of super hard material comprising grains of cubic boron nitride (cBN). Typically, the cBN grains are dispersed within a matrix comprising metal or ceramic. However, the present document is concerned with PcBN with no matrix or binder phase, sometimes referred to as binderless PcBN'. A "binder material" is understood to mean a matrix material that wholly or partially fills pores, interstices or interstitial regions within a polycrystalline structure.

A multi-modal size distribution of a mass of grains is understood to mean that the grains have a size distribution with more than one peak, each peak corresponding to a respective "mode". Multimodal polycrystalline bodies may be made by providing more than one source of a plurality of grains, each source comprising grains having a substantially different average size, and blending together the grains or particles from the sources. In one embodiment, a PcBN structure may comprise cBN grains having a multimodal distribution.

While this invention has been particularly shown and described with reference to embodiments, it will be understood by those skilled in the art that various changes in form and detail may be made without departing from the scope of the invention as defined by the appended claims.

The invention claimed is:

1. A translucent polycrystalline cubic boron nitride body which is disc-shaped and has a diameter selected from between 10 mm and 25 mm, and a height selected from 4 mm to 25 mm, the polycrystalline cubic boron nitride body consisting of:
polycrystalline cubic boron nitride grains with average grain sizes of 200 to 1000 nm;
no more than 2 weight % hexagonal boron nitride grains;
an absorption coefficient of less than 100 $cm^{-1}$ at a wavelength of 1064 nm;
wherein at least 50% of the polycrystalline cubic boron nitride grains are twinned.

2. The polycrystalline cubic boron nitride body according to claim 1, having a diameter selected from between 12 mm and 16 mm, and a height selected from 8 mm to 12 mm.

3. The polycrystalline cubic boron nitride body according to claim 1, comprising no more than 1.5 weight % hexagonal boron nitride grains.

4. The polycrystalline cubic boron nitride body according to claim 1, having a Knoop hardness of greater than 3800 HK1 under a 1 kg load.

5. The polycrystalline cubic boron nitride body according to claim 1, having any of an absorption coefficient of less than 100 cm-1 at a wavelength of 700 nm; and an absorption coefficient of less than 150 $cm^{-1}$ at a wavelength of 500 nm.

6. The polycrystalline cubic boron nitride body according to claim 1, having any of an absorption coefficient of less than 50 cm-1 at a wavelength of 1064 nm; and an absorption coefficient of less than 30 cm-1 at a wavelength of 1064 nm.

7. The polycrystalline cubic boron nitride body according to claim 1, having a Vickers Hardness of greater than 35 GPa.

* * * * *